United States Patent
Wu et al.

(10) Patent No.: US 8,026,804 B2
(45) Date of Patent: Sep. 27, 2011

(54) RESIDENTIAL SECURITY SURVEILLANCE AND NOTIFICATION MANAGEMENT SYSTEM

(75) Inventors: Chien-Huang Wu, Taipei (TW); Show-Ling Wu, Taipei (TW); Jhao-Siang Sun, Taipei (TW); Lun-Hsing Yeh, Taipei (TW); Shu-Fang Xiao, Taipei (TW); Yu-Huan Wang, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 669 days.

(21) Appl. No.: 12/125,218

(22) Filed: May 22, 2008

(65) Prior Publication Data

US 2011/0057787 A1    Mar. 10, 2011

(30) Foreign Application Priority Data

Aug. 29, 2007    (TW) .............................. 96131979 A (51) Int. Cl.
G08B 29/00    (2006.01)
G08B 1/08    (2006.01)
H04N 7/18    (2006.01)

(52) U.S. Cl. ... 340/506; 340/531; 340/521; 340/539.16; 340/539.18; 340/539.25; 348/135; 348/143

(58) Field of Classification Search ................... 340/506, 340/539.25
See application file for complete search history.

(56) References Cited

U.S. PATENT DOCUMENTS

| 7,409,045 B2 * | 8/2008 | Naidoo et al. | 379/37 |
| 2006/0001537 A1 * | 1/2006 | Blake et al. | 340/521 |

* cited by examiner

Primary Examiner — Donnie Crosland (57) ABSTRACT

The apparatus is applicable to a communications network, wherein, via an information processing platform of a network server end, the system is connected to a network surveillance device installed in a monitored environment, in which the information processing platform processes and saves event message about the environment acquired by the network surveillance device, and generates corresponding notification messages. Via a browsing authorization certification mechanism, the system allows a user having been identified as a certified user to connect to the information processing platform via a communication terminal device for monitoring message information. Using the system, a certified user is capable of the following: accessing or receiving surveillance message information via the information processing platform, receiving notification message from the information processing platform, accessing the information processing platform to manage and maintain user authorized certification information, and/or selectively switching on/off connection between the network surveillance device and the information processing platform.

15 Claims, 5 Drawing Sheets

FIG. 5 ns and communication system via the personal computer. In that a network camera or a personal computer has a unique IP address, when a user is not home, the user can first gain connection to a network communication system via a personal computer, laptop computer, or cell phone that has network communication functionality, and then connect to the aforesaid unique IP address in order to remotely receive video or audio messages acquired by the network camera.

RESIDENTIAL SECURITY SURVEILLANCE AND NOTIFICATION MANAGEMENT SYSTEM

BACKGROUND OF THE INVENTION

1. Field of the Invention

This invention generally relates to a surveillance data processing technique, and, more specifically, to a residential security surveillance and notification management system that is applicable to a communications network.

2. Description of Related Art

Personal privacy and security are becoming more of a concern in modern society. But just as technology may be used to compromise personal security and privacy, technology may able be used to protect it, particularly in light of advancements made in the network infrastructure of the Internet. In particular, advanced software/hardware techniques and higher efficiency and performance offered by network communication systems, such as the Internet, intranets and local networks, as well as the connected communication terminal devices, such as personal computers and mobile phones, users are increasingly becoming capable of monitoring an environment remotely via a network communication system, and further capable of delivering video messages via the network communication system in order to be attentive to family activities.

Specifically, users can install a network surveillance device at home, such as a network camera, wherein the network surveillance device can be directly connected to a network communication system, or can be connected first to a personal computer at home, and then further connected to the network communication system via the personal computer. In that a network camera or a personal computer has a unique IP address, when a user is not home, the user can first gain connection to a network communication system via a personal computer, laptop computer, or cell phone that has network communication functionality, and then connect to the aforesaid unique IP address in order to remotely receive video or audio messages acquired by the network camera.

Accordingly, the aforesaid prior security surveillance technique is capable of allowing users to receive instant information pertaining to a remote situation, including family activities. However, although such a system can provide convenience in security surveillance and allow remote participation, the prior security surveillance technique has various drawbacks that are in need of further improvement.

First, in a one-to-one usage situation in which a single user connects to the surveillance equipment, bandwidth is not especially critical for exchanging such point-to-point security surveillance messages. However, in a many-to-one usage situation, for instance, a network camera installed in kindergarten or elementary school serving many simultaneously viewing parents, a network camera would need to provide many connections to the same IP address. In such a situation, whether the network bandwidth is able to take the full workload becomes an issue.

Next, in that a security protection mechanism is commonly insufficient when exchanging messages using a network point-to-point protocol, a third party randomly accessing the same IP address can receive such security surveillance messages, not only making it impossible to achieve the objective of security surveillance, but also causing damage to users' privacy and security.

Furthermore, prior art security surveillance systems typically provide images only, or, at most, image and audio. As such, factors that may be hidden in the surroundings that potentially affect safety are not necessarily detected via acquired audio and video messages. Examples of such factors include: whether gates, doors or windows are opened or have been compromised; natural gas leaks; the presence of fire or smoke; or the presence of carbon monoxide or elevated levels of carbon dioxide. Knowledge of these kinds of factors is difficult to deliver via simple video and audio messages. And even if a message is finally delivered through these channels, it may be too late to avert disaster, thus such a surveillance system is not optimal.

Naturally, when there is no one home, a user hopes that he/she can still activate, control and utilize the monitoring system. But when the user is at home, or the user does not want to allow for remote monitoring, the user may wish to disable the delivery of various monitoring messages such that they may not be accessed by a third party. However, the user may still want to monitor some places via a local network, such as a front gate or nursery. However, according to the prior art remote security surveillance techniques, monitoring the house surroundings requires users to monitor via a public network communication system even when the users are at home, thereby taking the risk of giving away messages to an unauthorized third party.

Hence, it is highly desirable in the industry to provide an integrated residential security surveillance and notification management system that can efficiently solve the drawbacks of the prior art as identified above.

SUMMARY OF THE INVENTION

In view of the disadvantages of the prior art mentioned above, it is a primary objective of the present invention to provide a residential security surveillance and notification management system that is capable of processing and saving security event messages via a centrally-controlled information processing platform, and also generating corresponding security surveillance message information and security notification messages, thereby allowing users to obtain or receive security surveillance message information via the information processing platform and receiving security notification messages from the information processing platform.

It is another objective of the present invention to provide a residential security surveillance and notification management system that is capable of—via an authorization certification mechanism of the centrally-controlled information processing platform—accessing the information processing platform to obtain verification of user identity for receiving security surveillance messages for the monitored surroundings in order to prevent information from being divulged to an unauthorized user.

It is a further objective of the present invention to provide a residential security surveillance and notification management system that can connect to a network surveillance device that has a signal transmission function, and also that can connect to door or gate surveillance mechanisms, as well as safety-related detecting mechanisms for gas, smoke, and temperature surveillance, thereby obtaining the goal of integrated security surveillance.

It is still another objective of the present invention to provide a residential security surveillance and notification management system that is capable of allowing users to selectively switch on or switch off connection between the network surveillance device and the information processing platform.

It is still another objective of the present invention to provide a residential security surveillance and notification management system that is capable of providing encryption protection of the transmitted security surveillance message information and security notification messages, and then providing decryption at the user terminal, thereby achieving the objective of protecting the privacy of security surveillance message information and security notification messages during the transmission process.

To achieve the aforementioned and other objectives, a residential security surveillance and notification management system is provided according to the present invention that is applicable to a communications network, the residential security surveillance and notification management system comprising: [1] a network surveillance device, which is for acquiring analog or digital video and/or audio signals, and then converting the analog or digital video and/or audio signals into network transmittable digital signals, wherein the network surveillance device can also receive control signals transmitted via the communications network, and then executing commands including at least turning on/off acquisition of analog or digital video and/or audio signals based on the received control signal and/or a preset schedule; [2] an information processing platform, which has a database and is for receiving the digital signals transmitted from the network surveillance device via the communication network, and then processing the digital signals and saving them to the database; and [3] a communication terminal device, which has the functions of network communication, data processing, and data input/display; wherein by means of connecting the network surveillance device, information processing platform and communication terminal device to each other via the communications network, the system allows access and/or display of digital signal information stored in the database of the information processing platform, and also reception of input control signal and/or the preset schedule, and then transmission of the control signals to the information processing platform via the communication network, and, consequently allowing the information processing platform to generate other control signals based on the information of the received control signals, thereby allowing the operation of the network surveillance device to be remotely controlled via the communications network.

In another embodiment, the residential security surveillance and notification management system of the present invention further comprises at least one surroundings detecting unit, which is connected to the network surveillance device and is for transmitting surrounding security event messages to the network surveillance device, and then the surrounding security event messages are transmitted from the network surveillance device to the information processing platform via the communication network. Subsequently, the information processing platform converts the security event messages into security notification messages, and then the security notification messages are saved in the database, and also transmitted to the communication terminal device via the communications network.

In a further embodiment, the information processing platform of the residential security surveillance and notification management system of the present invention further comprises a certification module, which is for certifying if the network surveillance device and/or the communication terminal device have access authorization to connect to the information processing platform.

In a still another embodiment, the information processing platform of the residential security surveillance and notification management system of the present invention further comprises a user information management module, which is for, after a user identify identification module has verified that the communication terminal device has access authorization, allowing the user of the communication terminal device to access, manage and/or maintain user information via the communication terminal device.

In a still another embodiment, the network surveillance device of the residential security surveillance and notification management system of the present invention has a surveillance switching module, which is for switching on or off the functionality of the network surveillance device in terms of whether it transmits digital signals to the information processing platform, thus allowing a user to control whether remote monitoring is allowed.

In a final embodiment, the network surveillance device of the residential security surveillance and notification management system of the present invention further comprises an encryption module, which is for encrypting the digital signals before they are transmitted by the communication network to the information processing platform; and the information processing platform of the residential security surveillance and notification management system of the present invention further comprises a decryption module corresponding to the encryption module, wherein the decryption module is for decrypting the received encrypted digital signals before they are processed and saved.

In view of the above, compared with prior video remote management technique, the residential security surveillance and notification management system of the present invention is capable of processing and saving security event messages via the centrally-controlled information processing platform, and then generating corresponding security surveillance message information and security notification messages, consequently allowing users to obtain or receive security surveillance message information via the information processing platform, and also receive security notification messages from the information processing platform.

Additionally, via the authorization certification mechanism of the centrally-controlled information processing platform, the residential security surveillance and notification management system of the present invention is capable of entering the information processing platform to access security surveillance messages based on verification of user identity, thereby preventing information from being compromised.

In addition, the residential security surveillance and notification management system of the present invention is capable of allowing a user to selectively switch on or connection between the network surveillance device and the information processing platform.

Furthermore, the residential security surveillance and notification management system of the present invention is capable of connecting to a network surveillance device that has signal transmission function, and also connecting to a gate or door surveillance mechanism and/or detecting mechanisms for gas, smoke, and temperature that are safety-related, thereby obtaining the goal of integrated security surveillance.

Furthermore, the residential security surveillance and notification management system of the present invention is also capable of providing encryption protection in the transmission process of the security surveillance message information and security notification messages, and then executing decryption at the user terminal, thereby achieving the objective of protecting the security surveillance message information and security notification messages during the transmission process.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention; these and other advantages and effects can be readily understood by those in the art after reading the disclosure of this specification. The present invention can also be performed or applied by other differing embodiments. The details of the specification may be changed on the basis of different points and applications, and numerous modifications and variations can be devised without departing from the spirit of the present invention.

First Embodiment

Figure 1:
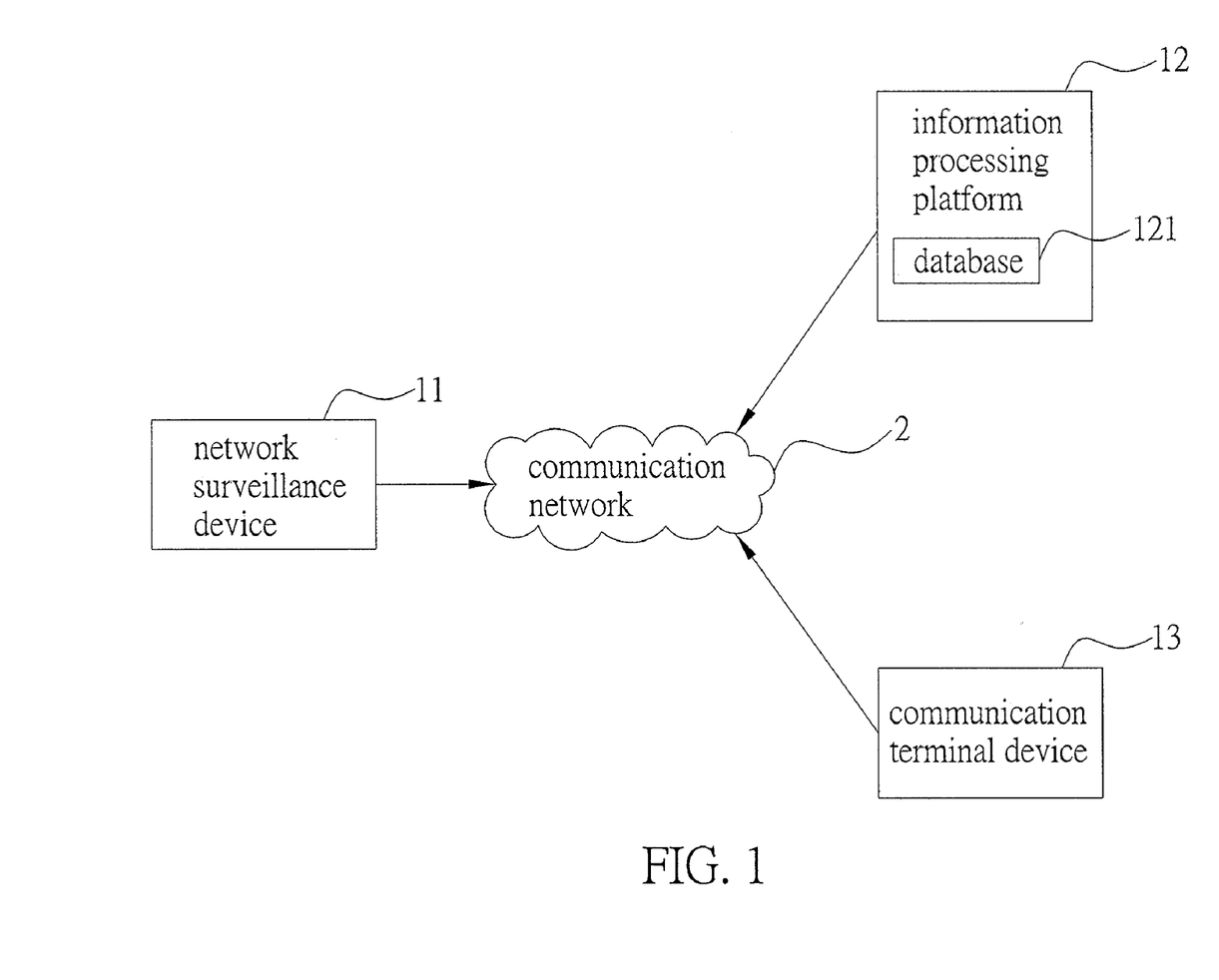
FIG. 1 is an applied framework diagram of the first embodiment of the residential security surveillance and notification management system of the present invention.

FIG. 1 is an applied framework diagram of the first embodiment of the residential security surveillance and notification management system of the present invention. As shown in the figure, the residential security surveillance and notification management system of the present invention comprises: a network surveillance device 11, an information processing platform 12, and a communication terminal device 13. In the present embodiment, the residential security surveillance and notification management system of the present invention is applicable to communications network 2. The communications network 2 can be: a wired or wireless intranet/internet for either a private or public network, such as a wired industrial network or a wireless telephone communication network using either second generation (2G), GPRS, third generation (3G), WiMax, CDMA, WCDMA or PHS technology.

The network surveillance device 11 is for acquiring analog image and/or audio signals, and then for converting the analog image and/or audio signals into digital signals, and also receiving control signal transmitted via the communication network 2, and, subsequently, executing various commands, wherein the commands at least consist of switching on/off acquisition of analog image and/or audio signals based on the control signals and/or a preset schedule.

In the present embodiment, the network surveillance device 11 can be, for instance, an image and/or audio acquiring device that has a specific network address and is capable of connecting to a network. More specifically, the network surveillance device 11 is capable of acquiring an image signal via anything that has a camera image acquisition unit, such as CCD, CMOS, or others, and also acquiring audio signals via an audio acquisition unit, such as a microphone or others.

In addition, the network surveillance device 11 comprises an analog-digital image and/or audio signal conversion processing unit, which is for converting the acquired analog image and/or audio signal into a digital signal format.

In addition, the network surveillance device 11 is capable of receiving control signals transmitted via the communications network 2, and then the control signals are used to control operation performed by the image acquisition unit and/or the audio acquisition unit. For instance, the received control signals can be used to control the switching on or off of acquisition of the analog images and/or audio signals, and the control signals can further control focus adjustment of the lens of the image acquisition unit and movement of the body of the network surveillance device 11 to directionally orient the contained image acquisition unit and/or audio acquisition unit.

Furthermore, in the present embodiment, the network surveillance device 11 has a communication interface, either wired or wireless. Preferably, the wired version of the communication interface is a power line communication (PLC) interface.

The information processing platform 12 has a data base 121 that is for storing information derived from the digital signals received from the network surveillance device 11 via the communication network 2 after such signals have been processed by the information processing platform 12.

In the present invention, the information processing platform 12 can be, for instance, an information processing platform 12 provided by an internet service provider (ISP) or one provided by the user. In either case, through the communications network 2, the information processing platform is also capable of receiving digital image and/or audio signals, which are transmitted from the network surveillance device 11 and converted by its analog-to-digital image and/or audio signal conversion processing unit. The database 121 can be, for instance, a data storage device that has a network connection function, such as a database server connected to a LAN or one provided by an internet service provider.

In the present embodiment, the digital video and/or audio signal conversion process comprises: converting the digital signal into the format of either 3GP ($3^{rd}$ Generation Partnership Project), MPEG-1, MPEG-2, MPEG-4, MP3, WAV, or AVI; and then transmitting the converted format by means of a protocol such as the real-time transport protocol (RTP) and/or the real time streaming protocol (RTSP).

The communication terminal device 13 has the functions of network communication, data processing, and data input/display; and by virtue of being connected with the information processing platform 12 via the communications network 2, the communication terminal device 13, via the information processing platform 12, is capable of accessing and/or displaying digital signal information stored in the database 121. In the present embodiment, the communication terminal device 13 can be any device that has network communication, data processing, and data input/display functionality, such as personal computer, notebook computer, mobile phone, personal digital assistant, ultra-mobile computer, mobile internet device and others.

Furthermore, the communication terminal device 13 is capable of acquiring control signal information input by a user in real-time or input previously by a user in the form of a preset schedule, and then transmitting the control signal information to the information processing platform 12 via the communication network 2. Subsequently, the information processing platform 12 is capable of generating a control signal based on the control signal information, and then controlling operation of the network surveillance device 11 via the communication network 2. According to the foregoing, via the communication terminal device 13, a user is allowed to input control signals, and then take control over the adjustment of focus of the lens of the image acquisition unit and movement of body of the network surveillance device 11, including the image acquisition unit and/or audio acquisition unit. Consequently, control signals are transmitted via the communication network 2 to the information processing platform 12, and the information processing platform 12 takes control over the network surveillance device 11 accordingly.

Second Embodiment

Figure 2:
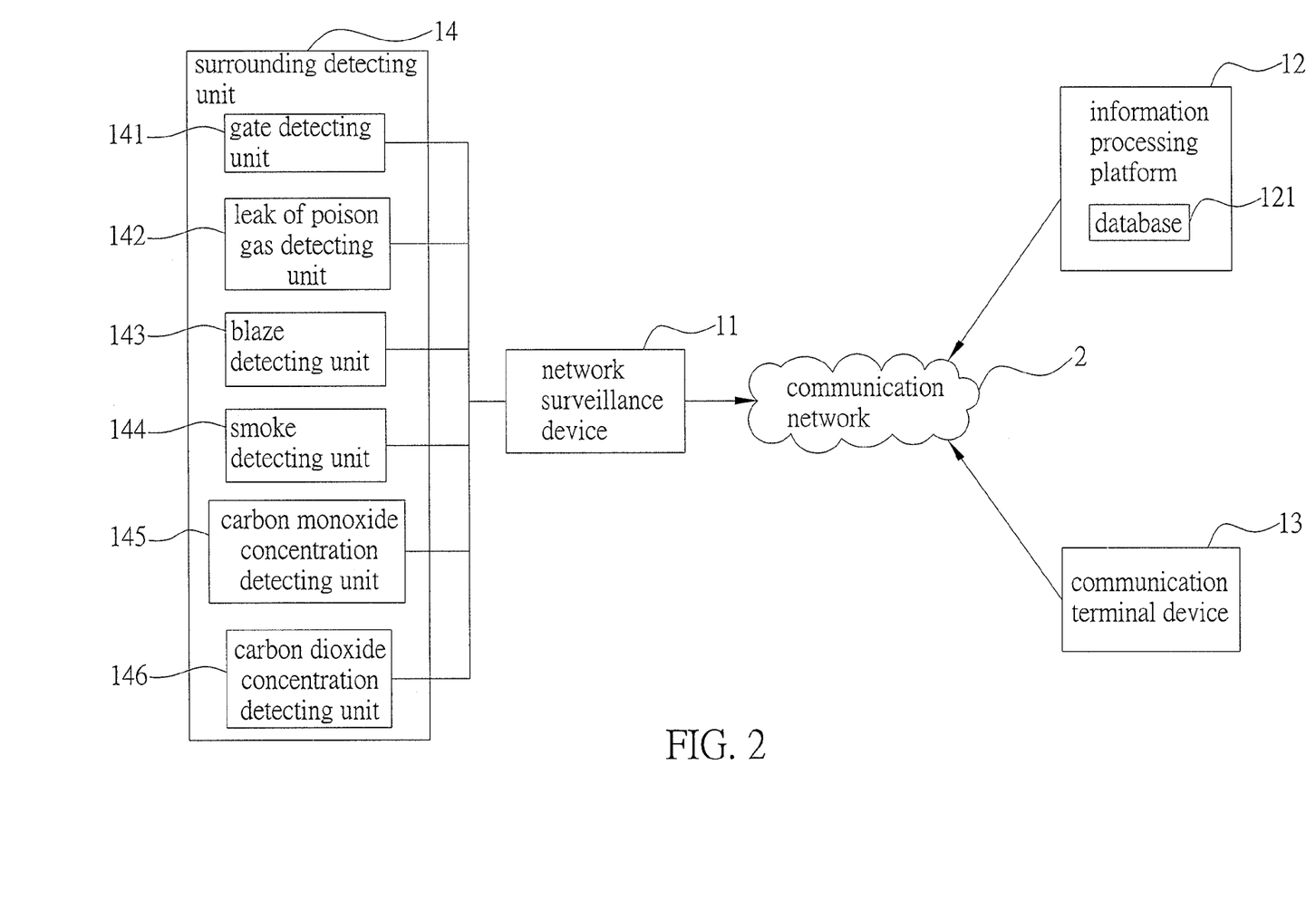
FIG. 2 is an applied framework diagram of the second embodiment of the residential security surveillance and notification management system of the present invention.

FIG. 2 is an applied framework diagram of the second embodiment of the residential security surveillance and notification management system of the present invention. As shown in the figure, the applied framework of the second embodiment is mostly the same as in the first embodiment, but further comprises one or more surrounding detecting units 14. The surrounding detecting unit 14 is connected with the network surveillance device 11, and is for transmitting detected security event messages to the network surveillance device 11, whereupon the detected security events are then transmitted from the network surveillance device 11 to the information processing platform 12 via the communication network 2. Subsequently, the information processing platform 12 converts the security event messages into security notification messages that are then saved in the database 121 and transmitted to the communication terminal device 13 via the communication network 2.

In the present invention, the surrounding detecting unit 14 is a selective combination of an entrance (window, door or gate) detecting unit 41, poisonous gas leak detecting unit 42, fire detecting unit 43, smoke detecting unit 44, carbon monoxide concentration detecting unit 45, and carbon dioxide concentration detecting unit 46. Additionally, the surrounding detecting unit 14 and the network surveillance device 11 are connected with each other by either a wired or wireless means.

Preferably, in the present embodiment, when the surrounding detecting unit 14 has transmitted a detected security event message to the network surveillance device 11, the network surveillance device 11 instantly acquires an analog image and/or audio signal of the surroundings of the surrounding detecting unit 14 that transmitted the security event message. For instance, if a security event message is transmitted by entrance detecting unit 41, the network surveillance device 11 instantly acquires an analog image and/or audio signal of the surroundings of the entrance detecting unit 41 that has transmitted the security event message. Consequently, an analog image and/or audio signal of the entrance situation at the moment the security event happened is acquired. Therefore, either instantly or later on, a user is capable of more clearly evaluating the nature of the event while by monitoring or accessing the security surveillance message information.

In addition, the security event message is transmitted to the communication terminal device 13 via the communication network 2 by means of either an instant message, e-mail, instant alarm announcement, or audio delivery, whereupon the information processing platform 12 converts the security event message into a security notification message that is then saved in the database 121, and also the security notification message is transmitted to the communication terminal device 13 via the communication network 2 by means of either an instant message, e-mail, instant alarm announcement, or audio delivery.

Third Embodiment

Figure 3:
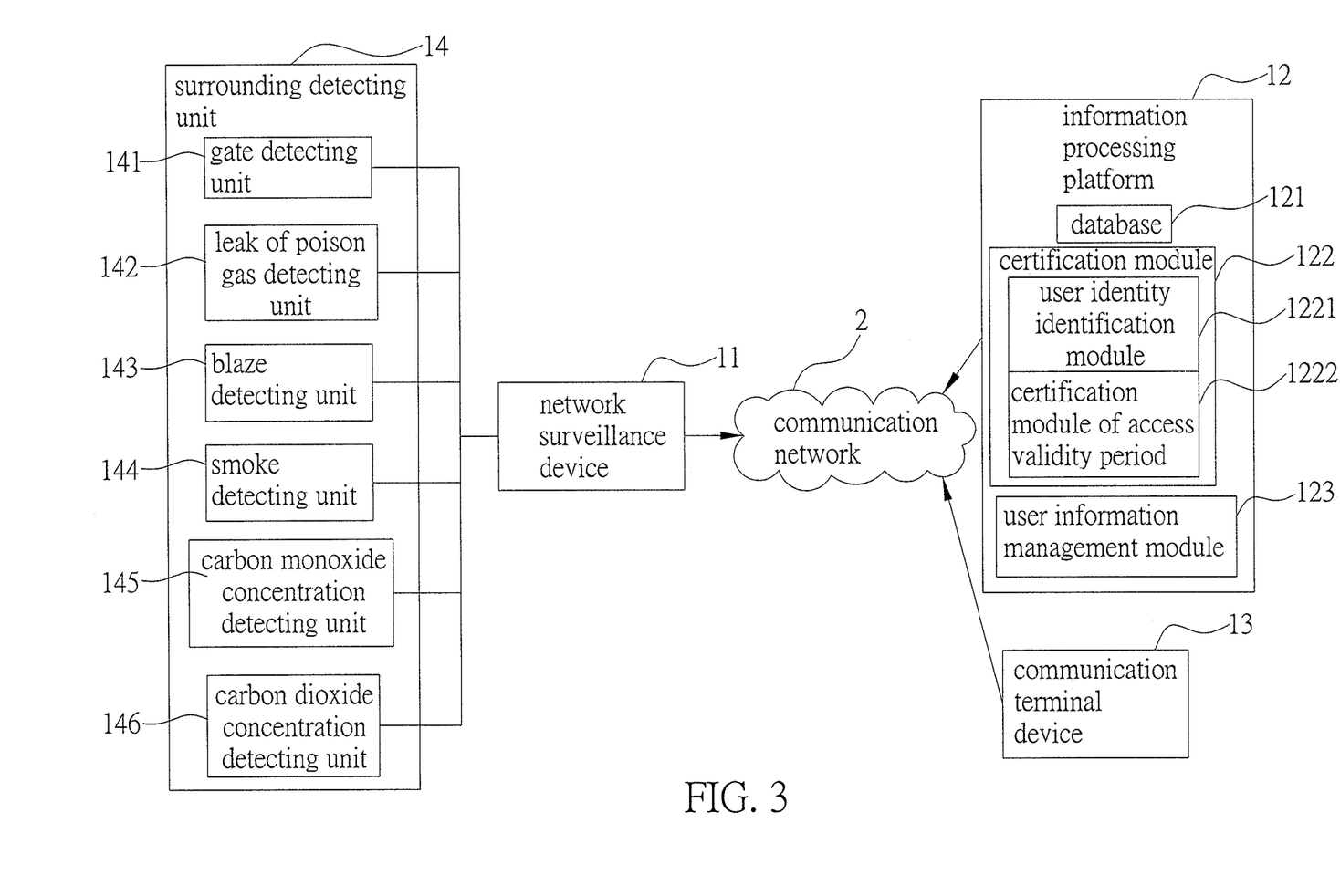
FIG. 3 is an applied framework diagram of the third embodiment of the residential security surveillance and notification management system of the present invention.

FIG. 3 is an applied framework diagram of the third embodiment of the residential security surveillance and notification management system of the present invention. The third embodiment can be integrated with the applied frameworks of the aforesaid first and/or second embodiments. As shown in the figure, in the present embodiment, the information processing platform 12 further comprises a certification module 122, which is for certifying if the network surveillance device 11 and/or the communication terminal device 13 are authorized to access the information processing platform 12.

In the present embodiment, a list of identity information corresponding to various network surveillance devices 11 is pre-saved in the database 121 of the information processing platform 12, wherein the certification module 122 identifies each network surveillance device 11 and accesses its corresponding identification information based on the media access control (MAC) address of the network surveillance device 11.

In addition, the database 121 further pre-saves not only access authorization information corresponding to identification information of each user identity but also certification information for the access validity period of such received digital signals. Consequently, the certification module 122 further comprises a user identity identification module 1221 and a certification module for access validity periods 1222.

The user identity identification module 1221 is for determining if identity identification information supplied/input by a user of the communication terminal device 13 and transmitted via the communication network 2 matches pre-stored data in order to decide whether the user is permitted access authorization.

After the user identity identification module 1221 has determined that a user of the communication terminal device 13 has access authorization, the certification module of access validity period 1222 further determines if the access authorization of the user of the communication terminal device 13 to access information in the database 121 is in effect or not at the time of attempted access and/or whether access authorization has expired. If access occurs at an authorized time and access authorization has not expired, the user of the communication terminal device 13 is permitted to access the information in the database 121; however, if the access attempt occurs during an unauthorized time or access authorization has expired, the user of the communication terminal device 13 is denied access to the information in the database 121.

Preferably, in the present embodiment, the identity identification information is a one-time password (OTP), wherein the identity identification information can be used only one time, and a different one-time password should be used for identification and authorization the next time.

More preferably, in the present embodiment, the information processing platform 12 further comprises an user information management module 123, wherein, when the user identity identification module 1221 has determined that the user of the communication terminal device 13 has access authorization, the user information management module 123 provides the user with a means to manage and/or maintain user information via the communication terminal device 13. Specifically, the information processing platform 12 is capable of providing a user with an operational interface or window environment, thus the user is capable of adding, deleting and modifying the user's information, as well as other functions in order to manage and/or maintain the user information via the communication terminal device 13.

Fourth Embodiment

Figure 4:
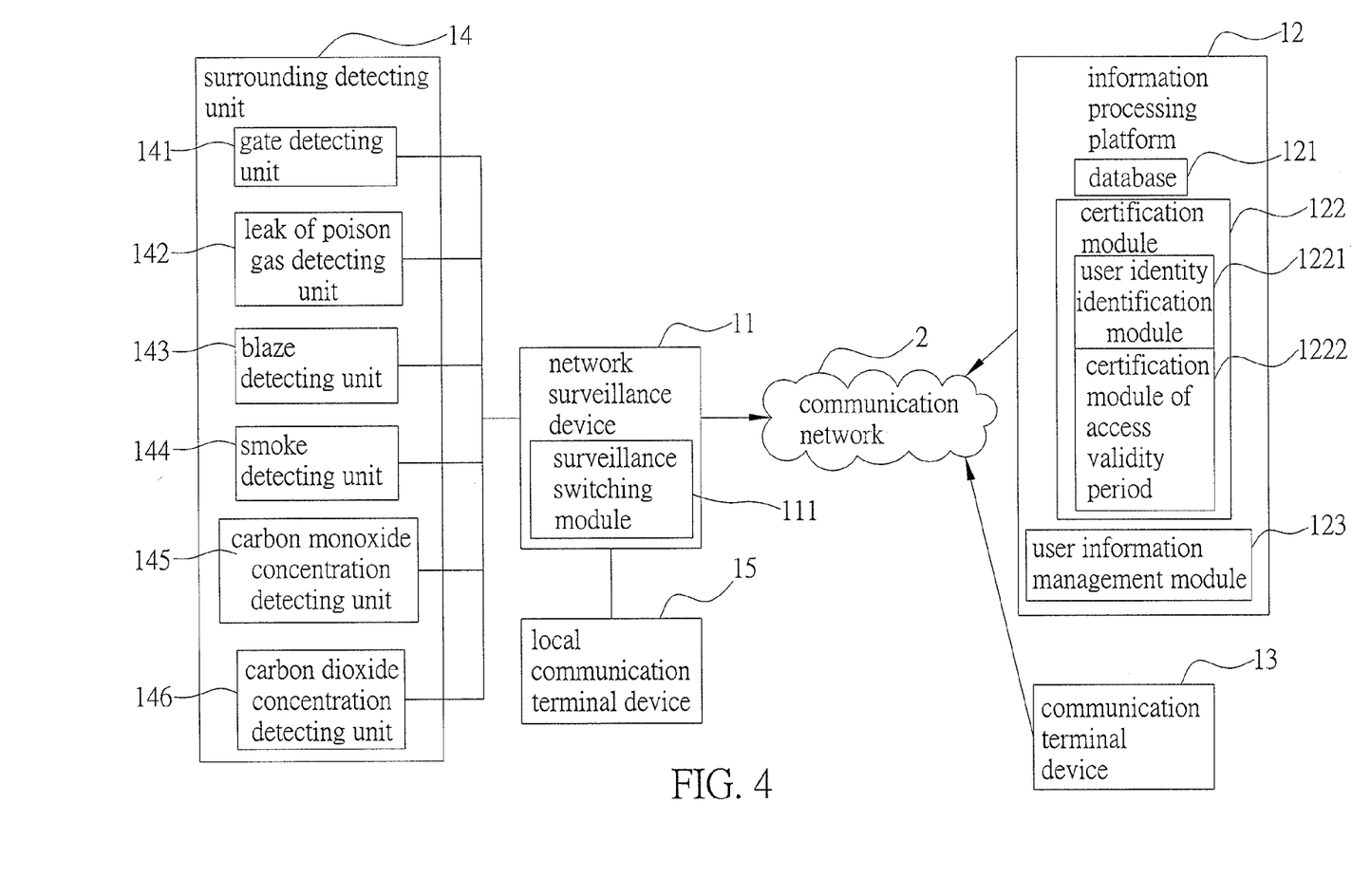
FIG. 4 is an applied framework diagram of the fourth embodiment of the residential security surveillance and notification management system of the present invention.

FIG. 4 is an applied framework diagram of the fourth embodiment of the residential security surveillance and notification management system of the present invention. The fourth embodiment can be integrated with the frameworks of the aforesaid first, second and/or third embodiments. As shown in the FIG., in the present embodiment, the network surveillance device 11 has a surveillance switching module 111, which is for switching on or off operation of the network surveillance device 11 for transmitting digital signals to the information processing platform 12 via the communication network 2.

In the present embodiment, the residential security surveillance and notification management of the present invention further comprises a local communication terminal device 15 that is connected to the network surveillance device 11. After the surveillance switching module 111 turns off operation of the network surveillance device 11 for transmitting digital signals to the information processing platform 12, the network surveillance device 11 transmits the digital signals to the local communication terminal device 15. Accordingly, when a user is home or does not want a third party to access messages about the status of the monitored surroundings, the user can simply have the surveillance switching module 111 turn off operation of the network surveillance device 11 for transmitting digital signals to the information processing platform 12, thereby obtaining the aforesaid privacy objective. Conversely, when a user wants to resume operation of the aforesaid residential security surveillance and notification management system of the present invention, the user simply activates the network surveillance device 11 using the surveillance switching module 111 in order to transmit digital signals to the information processing platform 12.

Fifth Embodiment

Figure 5:
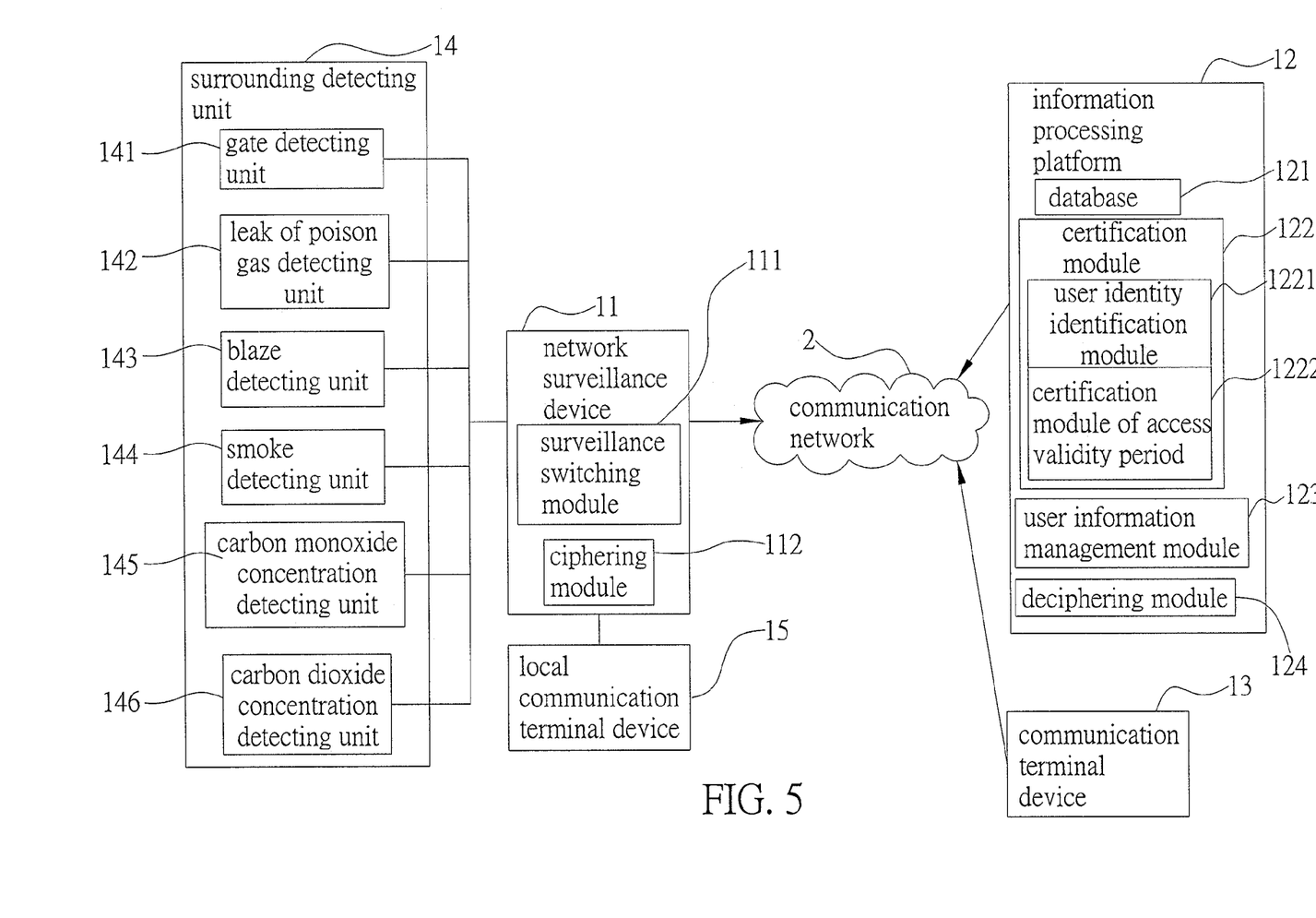
FIG. 5 is an applied framework diagram of the fifth embodiment of the residential security surveillance and notification management system of the present invention.

FIG. 5 is an applied framework diagram of the fifth embodiment of the residential security surveillance and notification management system of the present invention. The fifth embodiment can be integrated with the applied frameworks of the aforesaid first, second, third and/or fourth embodiments. As shown in the figure, in the present embodiment, the network surveillance device 11 comprises an encrypting module 112, which is for encrypting the digital signals before they are transmitted via the communication network 2 to the information processing platform 12; and, correspondingly, the information processing platform 12 comprises a decryption module 124 for decrypting the encrypted information encrypted by the encrypting module 112 before the information is processed and saved. Accordingly, when the network surveillance device 11 is transmitting digital image and/or audio signals via the communication network 2, the present embodiment is capable of preventing the transmitted signals from being understood by an unauthorized third party, thereby securing privacy.

Sixth Embodiment

A sixth embodiment of the residential security surveillance and notification management system of the present invention is provided that can be integrated with the applied frameworks of the foresaid first, second, third, fourth, and/or fifth embodiments. In the present embodiment, an existing firewall and/or a network routing device (not shown in the figures) are further included between the network surveillance device 11 and the information processing platform 12, wherein the network surveillance device 11 utilizes either physical address, floating address, real address, or virtual address, and is capable of passing any security restrictions of the firewall and/or the network routing device to communicate with the information processing platform 12, as well as rejecting any communication requests not sent from the information processing platform 12.

In view of the above, the residential security surveillance and notification management system of the present invention is capable of not only processing and saving security event messages via a centrally-controlled information processing platform, but also of generating corresponding security surveillance messages and security notification messages. Consequently, users are allowed to acquire or receive security surveillance messages via the information processing platform, and receive notification messages from the information processing platform. Furthermore, the authorization certification mechanism of the centrally-controlled information processing platform performs user identity identification before user's are permitted to enter the information processing platform to acquire security surveillance messages or stored information, thereby preventing information from being compromised. In addition, users are provided with the ability to selectively establish connection between the network surveillance device and the information processing platform. Furthermore, the network surveillance device can be connected with an entrance surveillance mechanism and/or various detecting mechanisms, such as those for gas, smoke, fire or even temperature, thereby obtaining the objective of an integrated security surveillance system. Finally, the security surveillance message information and security notification messages can be encrypted for protection while in transmission, and then decrypted at user's terminal, thereby obtaining the objective of protecting the security surveillance message information and the security notification messages during transit.

The foregoing descriptions of the detailed embodiments are only illustrated to disclose the features and functions of the present invention and are not to be construed as restrictive of the scope of the present invention. Various modifications and variations made according to the spirit and principles of the disclosure of the present invention should be considered to fall within the scope of the invention as described in the appended claims.

What is claimed is:

1. A residential security surveillance and notification management system, which is applicable to a communication network, comprising:
   a network surveillance device comprising an image and/or sound acquisition unit installed in a body, wherein the network surveillance device is for acquiring analog or digital images and/or audio signals, and then converting the analog or digital images and/or audio signals into digital signals; and also receiving control signals transmitted via the communication network, and then, based on the control signals and/or a preset schedule, executing at least the operations of turning on or off acquisition of analog or digital images and/or audio signals, adjusting focus of the image being acquired, and effecting movement of the body of the network surveillance device;
   an information processing platform having a database, wherein the information processing platform receives digital signals transmitted from the network surveillance device via the communication network, processes the received digital signals and then saves them in the database; and
   a communication terminal device, which has the functions of network communication, data processing, and data input/display, wherein by connecting with the information processing platform via the communication network, the communication terminal device is capable of accessing and/or presenting digital signal information saved in the database as well as receiving control signal information and/or a preset schedule, whereupon the control signal information is transmitted to the information processing platform via the communication network, and, subsequently, the information processing platform generates additional control signal based on the information of the received control signals, such that the communication network controls operations of the network surveillance device, wherein the information processing platform further comprises a certification module for certifying if the network surveillance device and/or the communication terminal device have access authorization to connect to the information processing platform, and wherein, for each user, the database has pre-saved access authorization information in the form of identity identification information as well as certification information pertaining to an access validity period for accessing digital signal information, the certification module comprising:

a user identity identification module, which is for determining if the identity identification information of the communication terminal device transmitted via the communication network has access authorization and corresponding details of the access authorization; and a certification module for the access validity period, which, after the user identity identification module has determined that the communication terminal device has access authorization, further determines if the access authorization of the communication terminal device to access digital signal information in the database has expired or not, wherein, if it has not expired, the communication terminal device is allowed to access the digital signal information in the database, and, if the access authorization has expired, the communication terminal device is denied access to the digital signal information in the database.

2. The residential security surveillance and notification management system of claim 1, further comprising at least a surrounding detecting unit, which is connecting to the network surveillance device and is for transmitting detected security event messages to the network surveillance device, whereupon, the network surveillance device transmits the detected security event messages to the information processing platform via the communication network, and, subsequently, the information processing platform converts the security event messages into security notification messages that are then saved in the database and transmitted to the communication terminal device via the communication network either simultaneously or later upon request.

3. The residential security surveillance and notification management system of claim 2, wherein the surrounding detecting unit is a selective combination of an entrance detecting unit, poisonous gas detecting unit, fire detecting unit, smoke detecting unit, carbon monoxide concentration detecting unit, and carbon dioxide concentration detecting unit.

4. The residential security surveillance and notification management system of claim 2, wherein the surrounding detecting unit is connecting to the network surveillance device by either a wired or wireless means.

5. The residential security surveillance and notification management system of claim 2, wherein the security event messages are transmitted to the communication terminal device via the communication network by means of either instant messages, e-mail, instant alarm announcements, or audio delivery.

6. The residential security surveillance and notification management system of claim 2, wherein, when the surrounding detecting unit transmits detected security event messages to the network surveillance device, the network surveillance device instantly acquires analog or digital images and/or audio signals of the surrounding of the surrounding detecting unit that transmitted the security event message.

7. The residential security surveillance and notification management system of claim 1, wherein the database has a list of pre-saved identification information corresponding to various network surveillance devices, and the certification module identifies each network surveillance device and accesses its corresponding identification information based on the unique media access control (MAC) address of each network surveillance device.

8. The residential security surveillance and notification management system of claim 1, wherein the identity identification information is a one-time password (OTP).

9. The residential security surveillance and notification management system of claim 1, wherein the information processing platform further comprises a user information management module, which is for, after the user identity identification module has determined that the communication terminal device has access authorization, allowing the user of the communication terminal device to manage and/or maintain user information.

10. The residential security surveillance and notification management system of claim 1, wherein the network surveillance device has a surveillance switching module, which is for switching on/off operation of the network surveillance device to transmit digital signals to the information processing platform via the communication network.

11. The residential security surveillance and notification management system of claim 1, wherein the network surveillance device has a communication interface, either wired or wireless.

12. The residential security surveillance and notification management system of claim 11, wherein the wired communication interface is a power line communication (PLC) interface.

13. The residential security surveillance and notification management system of claim 1, wherein a firewall and/or a network routing device are further included between the network surveillance device and the information processing platform, wherein the network surveillance device is utilizing either physical addresses, floating addresses, real addresses, or virtual addresses, and is capable of passing any security restrictions of the firewall and/or the network routing device to communicate with the information processing platform, as well as rejecting any communication requests not sent from the information processing platform.

14. The residential security surveillance and notification management system of claim 1, wherein processing of the digital signal comprises: converting the digital signal into the format of either 3GP ($3^{rd}$ Generation Partnership Project), MPEG-1, MPEG-2, MPEG-4, MP3, WAV, or AVI; and transmitting the converted format by means of RTP and/or RTSP.

15. The residential security surveillance and notification management system of claim 1, wherein the network surveillance device further comprises: an encryption module, which is for encrypting digital signals before the communication network transmits the digital signals to the information processing platform; and a decryption module corresponding to the encryption module, the decryption module being for decrypting the encrypted digital signal before they are processed by the information processing platform and, optionally, saved in the database thereof.

* * * * *